United States Patent
Cislo (10) Patent No.: US 8,753,018 B2
(45) Date of Patent: Jun. 17, 2014

(54) WHEEL END SUPPORT BEARING

(75) Inventor: Lawrence Cislo, Brighton, MI (US)

(73) Assignee: Schaeffler KG (DE)

( * ) Notice: Subject to any disclaimer, the term of this patent is extended or adjusted under 35 U.S.C. 154(b) by 452 days.

(21) Appl. No.: 12/530,059

(22) PCT Filed: Mar. 7, 2008

(86) PCT No.: PCT/IB2008/001532
§ 371 (c)(1),
(2), (4) Date: Sep. 4, 2009

(87) PCT Pub. No.: WO2008/110938
PCT Pub. Date: Sep. 18, 2008

(65) Prior Publication Data
US 2010/0027931 A1  Feb. 4, 2010

Related U.S. Application Data (60) Provisional application No. 60/894,032, filed on Mar. 9, 2007.

(51) Int. Cl.
*F16C 19/49* (2006.01)
*F16C 33/58* (2006.01)
*F16C 13/00* (2006.01)

(52) U.S. Cl.
USPC ............................ 384/494; 384/544; 384/513

(58) Field of Classification Search
USPC ......... 384/544, 589, 494, 456–458, 484, 486, 384/513, 548, 477, 482
See application file for complete search history.

(56) References Cited

U.S. PATENT DOCUMENTS

| | | | | |
|---|---|---|---|---|
| 2,170,498 A | * | 8/1939 | Hektner | 384/589 |
| 2,839,343 A | * | 6/1958 | Bensch | 384/454 |
| 3,795,960 A | * | 3/1974 | Elmore et al. | 29/898.066 |
| 4,296,979 A | | 10/1981 | Hofmann et al. | |
| 4,715,780 A | * | 12/1987 | Kan | 415/200 |
| 5,590,967 A | * | 1/1997 | Kapaan | 384/448 |

(Continued)

FOREIGN PATENT DOCUMENTS

| | | |
|---|---|---|
| DE | 96 84 32 | 2/1958 |
| DE | 10 45 737 | 12/1958 |

(Continued)

OTHER PUBLICATIONS

International Search Report issued in corresponding international application No. PCT/IB2008/001532.

*Primary Examiner* — Alan B Waits
(74) *Attorney, Agent, or Firm* — Ostrolenk Faber LLP (57) ABSTRACT

A wheel bearing useful for automobiles includes an axle shaft and an axle tube around the shaft, inner and outer bearing races defined respectively at the outer periphery of the shaft and the inner periphery of the tube. A circumferential row of balls and a circumferential set of rollers disposed axially apart between the inner and outer bearing races to form a ball bearing and a roller bearing, in parallel, for supporting the axle shaft within the axle tube.

11 Claims, 6 Drawing Sheets

(56) References Cited

U.S. PATENT DOCUMENTS

| | | | |
|---|---|---|---|
| 5,927,867 A | | 7/1999 | Niebling et al. |
| 6,036,371 A | | 3/2000 | Onose |
| 6,461,050 B2 | * | 10/2002 | Muraki et al. ............... 384/513 |
| 7,588,371 B2 | * | 9/2009 | Moller et al. ............... 384/454 |
| 2002/0097938 A1 | * | 7/2002 | Muraki et al. ............... 384/513 |
| 2004/0165803 A1 | * | 8/2004 | Barbiero et al. ............. 384/544 |
| 2005/0111771 A1 | * | 5/2005 | Shevket ....................... 384/544 |
| 2006/0171624 A1 | * | 8/2006 | Niebling et al. ............. 384/544 |
| 2007/0242913 A1 | * | 10/2007 | Kawaguchi ................. 384/504 |

FOREIGN PATENT DOCUMENTS

| | | | | |
|---|---|---|---|---|
| DE | 67 52 038 | | 9/1969 | |
| DE | 80 14 137 | | 5/1980 | |
| DE | 29 07 342 | | 9/1980 | |
| DE | 197 13 333 C2 | | 10/1998 | |
| DE | 10 2004 020851 A1 | | 11/2005 | |
| FR | 2 372 989 A | | 6/1978 | |
| JP | 62-210102 | | 9/1987 | |
| JP | 03144109 A | * | 6/1991 | ............. F16C 13/00 |
| JP | 2007-303653 A | | 11/2007 | |

* cited by examiner

FIG.6d Angular Contact

FIG.6c Four Point

FIG.6b Three Point

FIG.6a Two Point

WHEEL END SUPPORT BEARING

CROSS REFERENCE TO RELATED APPLICATIONS

The present application is a 35 U.S.C. §§371 national phase conversion of PCT/IB2008/001532, filed Mar. 7, 2008, which claims priority of U.S. Provisional Application No. 60/894,032, filed Mar. 9, 2007, the disclosure of which is incorporated by reference herein. The PCT International Application was published in the English language.

BACKGROUND OF THE DISCLOSURE

1. Field of the Disclosure

The present disclosure relates to an improved support bearing for use, for example, for supporting the wheel end of an automobile axle.

2. Background Art

A bearing for an automotive axle performs several functions. It supports both radial and axial loads, including the weight of the vehicle and the additional wheel loads due to vehicle cornering. It transmits torque from the differential to the wheel. In particular, it is desirable to keep the torque as low as possible.

DE 80 14 137, DE 67 52 038, JP 62-210102, DE 29 07 342, DE 10 45 737, and DE 96 84 32 disclose ball bearing and cylindrical or needle roller bearing arrangements of background interest. However, none of these references discloses the automotive wheel end support bearing described herein.

SUMMARY

The bearing design for an automotive axle proposed herein combines a ball bearing and a roller bearing arrayed axially and located between an axle and a tube around the axle. Several benefits may be obtained.

A rear axle provided with such a bearing may be easier and cheaper to assemble than axles with bearings in the prior art. Unlike known bearings, a clamp load is not required across the bearing. Clamp load is required, for example, when using a known single-row taper (unitized) concept.

Also, a "C" clip is usually required in the differential at the axle when a conventional cylindrical bearing is used around the axle. With the disclosed bearing, the "C" clip conventionally required in the differential is eliminated. Also, a cylindrical roller bearing may have excessive axial play, which is particularly undesirable for a wheel speed sensor. The new bearing has less axial play.

The bearing herein may have improved axial rigidity and spindle stiffness. Thus, brake judder is reduced. This may lead to better brake response and improved disk brake wear being achieved.

The bearing may have higher efficiency (less bearing torque loss) than a conventional unitized taper. There is no sliding friction between the rolling elements and the side face.

The disclosed bearing may have the potential to reduce overall system cost. For example, an oil seal can be integrated into the bearing. It is possible to "seal the bearing for life" and move the oil seals to the ends of the differential, thus saving gear oil. The number of components in the system may be reduced as well.

According to various embodiments, an automobile wheel bearing may comprise the following components. There is an axle shaft connected to a wheel hub. An axle tube encircles a part of the shaft and is radially spaced out from the shaft. Inner and outer bearing races are formed respectively outside the axle and inside the tube and are opposed to each other. A set of rollers in a circumferential row toward the hub and a set of balls in another circumferential row further from the axle hub are disposed between and contact the inner and outer bearing races to form a ball bearing and a roller bearing, in parallel planes, for supporting the axle shaft within the axle tube.

The inner and outer raceways on the surfaces of the races may be conventionally configured for two-, three-, or four-point or angular contact with the balls of the ball bearing.

One or more seals and/or a cover plate may be positioned axially for enclosing the inner and outer bearing races and particularly for enclosing the ball and roller bearings.

The inner race of at least the roller bearing, or of both the roller bearing and the ball bearing, may be provided by portions of the axle shaft.

Other features and advantages will become apparent from the following description which refers to the accompanying drawings.

DETAILED DESCRIPTION OF EMBODIMENTS

All of the disclosed embodiments of the wheel end support bearing comprise a common core of components, and redundant descriptions of the various common components will be omitted.

Referring to the embodiments in all of FIGS. 1-5, an automobile wheel hub 10 is typically formed integrally with or attached to an axle shaft 12. The axle shaft 12 is surrounded concentrically by an axle tube 14 spaced outward radially from the shaft. That tube may be at or part of the vehicle body or other part that does not move with the axle. A distal end 24 of the axle tube 14 is disposed substantially adjacent to but spaced away from the wheel hub 10. The distal end 24 is considered to be "distal" in the sense of being distal from the automobile differential, which is not shown, but which would be located away from the hub 10 past the right-hand side of each of the respective Figures. This mutual arrangement of the wheel hub 10, axle shaft 12 and axle tube 14 is well known to the art.

Also seen in FIGS. 1-5 are embodiments of a wheel bearing providing mutual or relative rotation of the axle shaft 12 and the axle tube 14. For this purpose, there are provided a circumferential row of rollers 16 and a corresponding roller cage 18 for the roller row and a short axial distance away, a circumferential row of balls 20 and a corresponding ball cage 22 for the row of balls. The rows 16 and 20 extend circumferentially in the radial space between the axle shaft and the axle tube. Together with respective bearing races, described below, the rollers 16 form a roller bearing and the balls 20 form a ball bearing which are disposed close together axially inside the distal end 24 of the axle tube.

Embodiment 1

Figure 1:
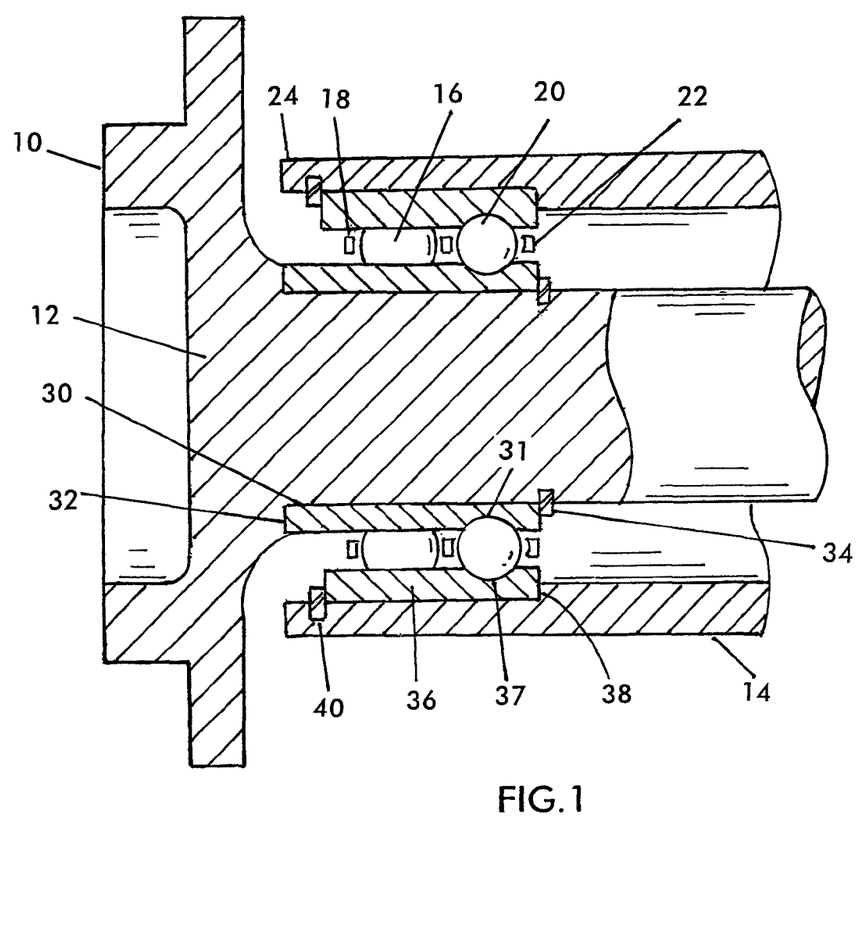
FIG. 1 is a partial cross-sectional view showing a first embodiment of the disclosed bearing.

In the first embodiment FIG. 1, an inner bearing race 30 comprises a cylindrical bearing ring mounted concentrically and securely around the periphery of the axle shaft 12 adjacent or substantially adjacent to the wheel hub 10. The inner race is secured at a distal end by a shoulder 32 formed between the wheel hub 10 and the axle shaft 12 and is secured at a proximal end by a snap ring 34 which engages the shaft 12, for example in a groove provided for that purpose.

The outer race 36 on the other hand comprises a cylindrical ring secured at a proximal end to the interior of the axle tube 14 by a shoulder 38 formed in the axle tube 14 and at a distal end by a snap ring 40 which engages the axle tube 14, for example in a groove therein. The inner and outer races are opposed.

Appropriately indented or grooved raceways 31 and 37 are formed respectively in the inner and outer races for accommodating the row of balls 20. The bearing rollers 16 are cylindrical and engage the raceways. No indentation is provided for the cylinders in the raceways.

No sealing elements are integrated into the bearing in this embodiment. The bearing may be lubricated by differential oil. Suitable seal elements external to the bearing may be provided.

Embodiment 2

Figure 2:
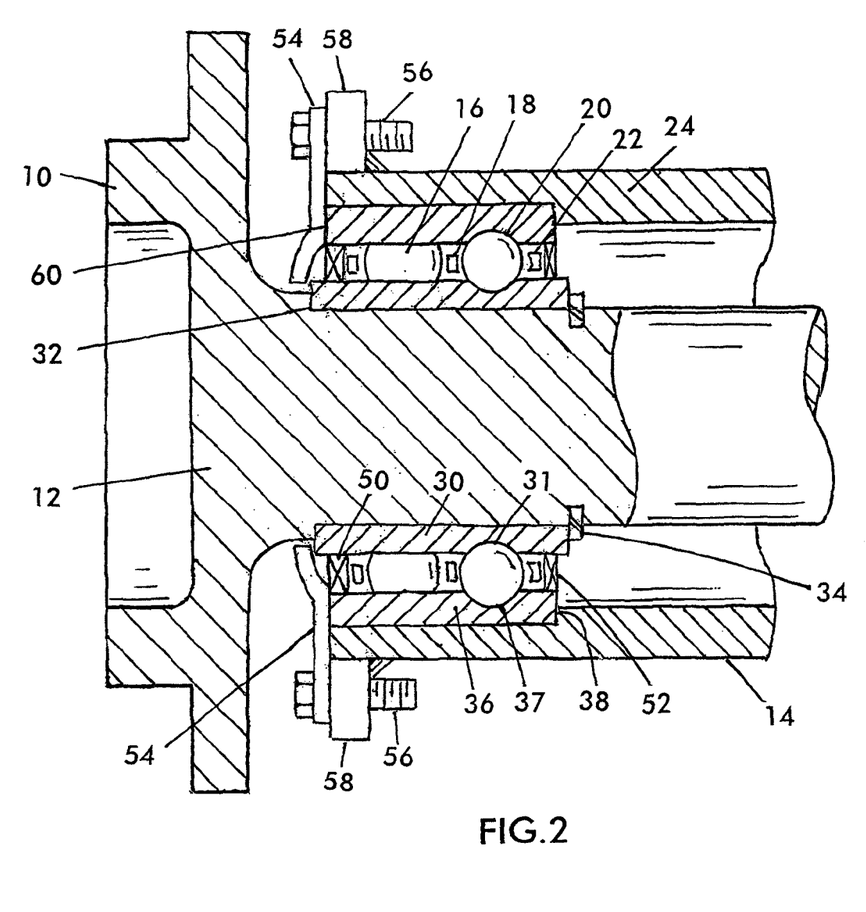
FIG. 2 is a partial cross-sectional view showing a second embodiment of the disclosed bearing.

In the second embodiment in FIG. 2, sealing elements 50 and 52 are positioned into the bearing between the distal and proximal ends, respectively, of the inner race 30 and the outer race 36 and axially outward of the rows of rollers and balls. By these sealing elements, the bearing between the sealing elements can be one that is "sealed for life" with no additional need for outside lubrication.

An annular cover plate 54 is fastened near the radially outward edge of the plate by a plurality of bolts 56 which in turn are secured to one or more flanges 58 extending radially outwardly from the axle tube 14. At its radially inward end, the cover plate 54 secures the distal end 60 of the outer bearing race 36. Moreover, the cover plate 54 extends radially inward as close as is practicable to the distal end of the inner race 30, i.e., to the shoulder 32 and to the wheel hub 10, in order to block the entry of contaminants into the bearing.

Embodiment 3

Figure 3:
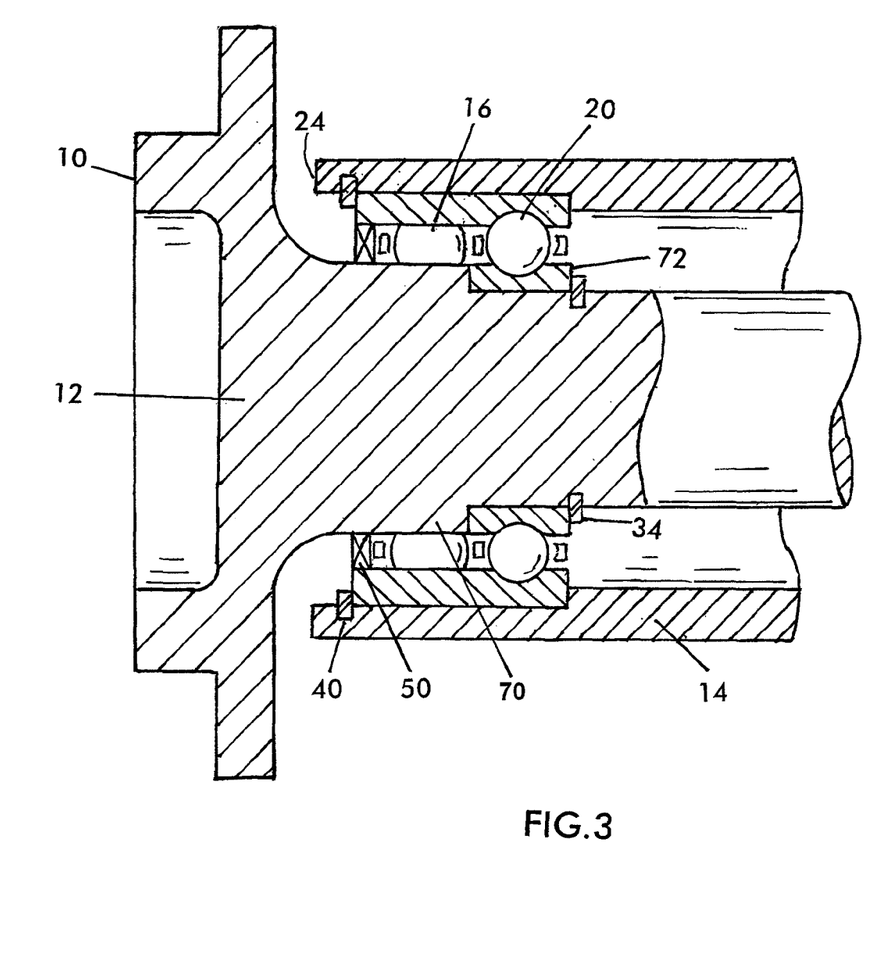
FIG. 3 is a partial cross-sectional view showing a third embodiment of the disclosed bearing.

In the third embodiment in FIG. 3, an extended shoulder 70 formed in the axle shaft 12 extends in the proximal direction from the wheel hub 10 far enough to serve as the inner race of the more distal row of roller bearings. The same shoulder 70 also secures the distal end of the inner race 72 which accommodates the balls 20 of the ball bearing.

In this example, one oil seal 50 is integrated into one end of the bearing. The bearing may be lubricated by gear oil from the differential.

Embodiment 4

Figure 4:
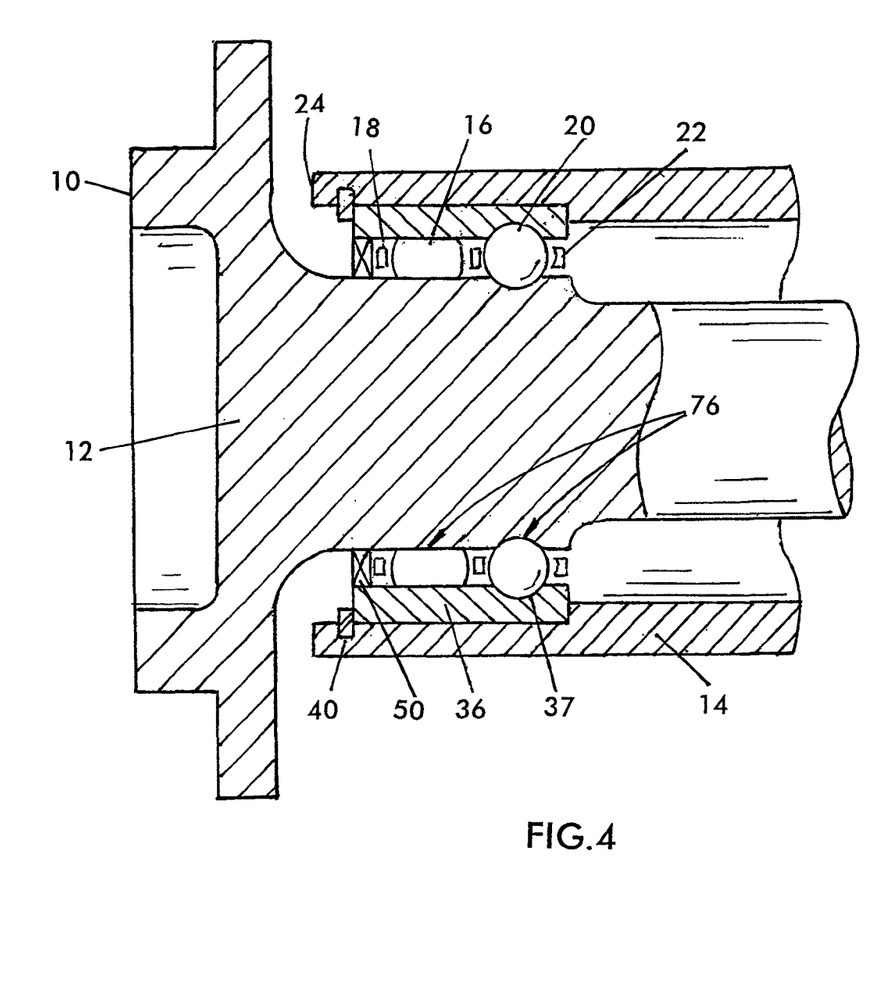
FIG. 4 is a partial cross-sectional view showing a fourth embodiment of the disclosed bearing.

In the fourth embodiment in FIG. 4, an extended shoulder 76 formed in the axle shaft 12 extends far enough in the proximal direction to serve as the inner race for both the ball bearing and the roller bearing. Otherwise, this embodiment may be identical to or may have the same elements as the third embodiment.

Embodiment 5

Figure 5:
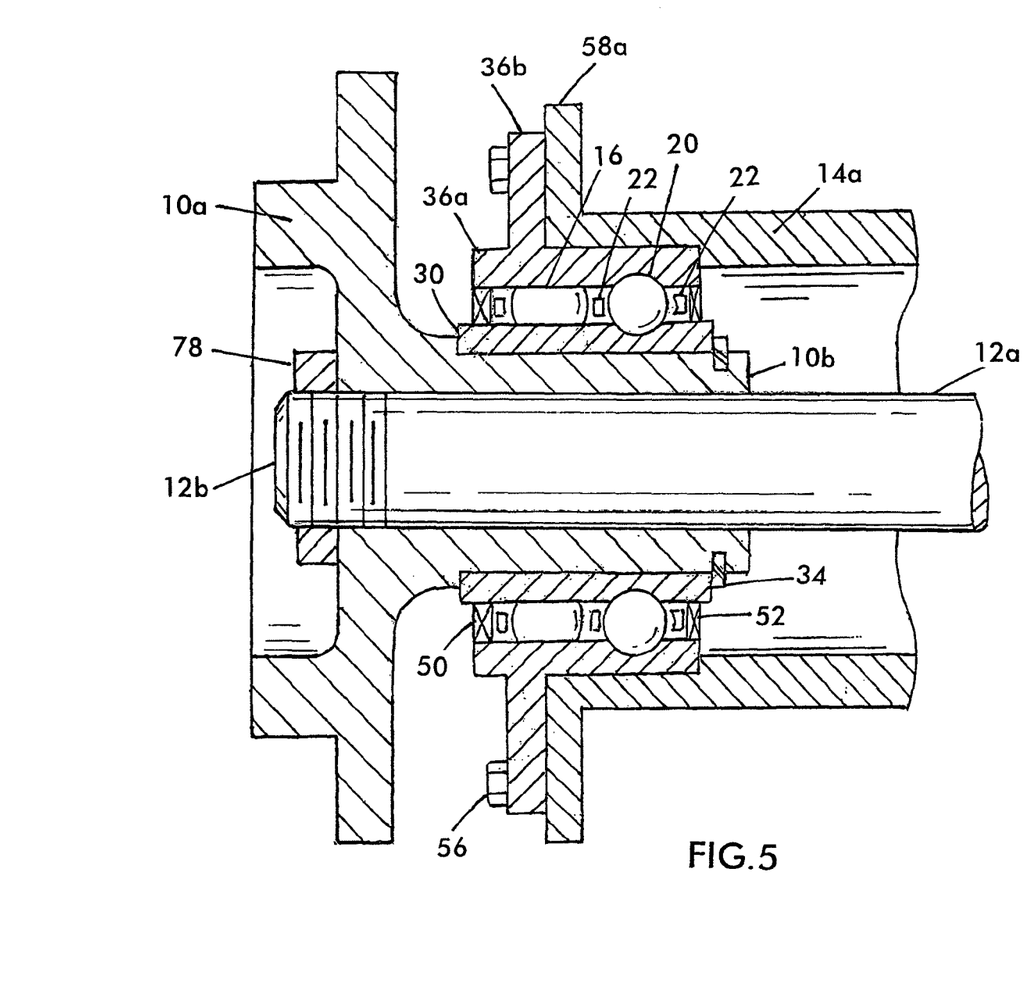
FIG. 5 shows a fifth embodiment, including an arrangement for mounting the bearing on an axle.
Figure 6A:
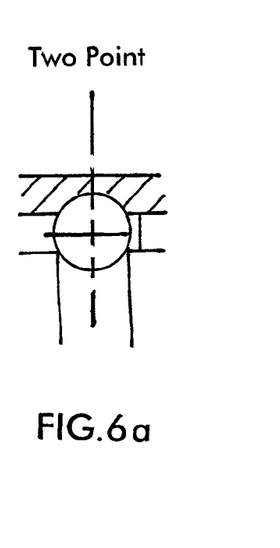
FIG. 6 shows four possible raceway configurations for the ball bearing portion of the disclosed bearing.
Figure 6B:
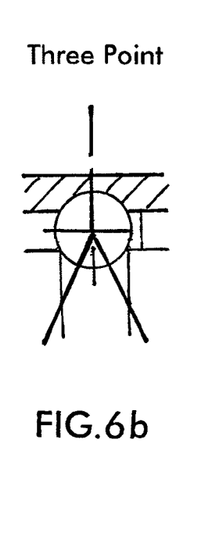
Figure 6C:
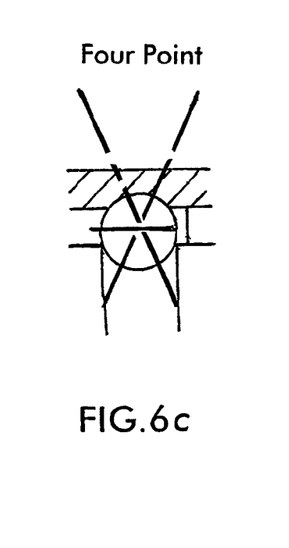
Figure 6D:
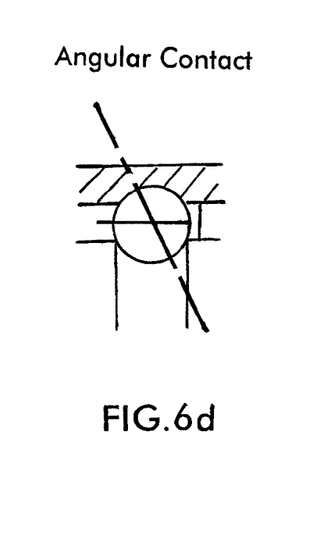

FIG. 5 shows the fifth embodiment, which is similar to FIG. 2, but has additional features configured for mounting the bearing on an axle. In this example, the wheel hub 10a is not integral with the axle shaft 12 as in the other embodiments. Instead, the wheel hub has a cylindrical portion 10b that extends in the proximal direction (toward the right in the Figure). The axle shaft 12a is substantially constant in diameter. It is threaded at its distal end 12b. The end 12b is passed through the cylindrical portion 10b of the hub 10a and is secured to the wheel hub 10a by a nut 78 tightened on the thread at end 12b.

The outer race 36a has one or more radially extending flanges 36b. This flange or these flanges 36b are fastened by bolts 56 to corresponding flange or flanges 58a extending radially from the axle tube 14a.

A cover plate may also be provided, as in the second embodiment.

In this embodiment, the wheel hub 10a, the axle shaft 12a, the bearing (30, 36a and related components), and the axle tube 14a are separable components, which may simplify both the assembly process and repairs when needed.

FIG. 6 shows ball raceway configurations which may be used with any of the foregoing embodiments. As shown, the raceways may be configured so as to provide (a) two-point, (b) three-point, (c) four-point, or (d) angular contact between the balls and the raceway.

U.S. Pat. No. 5,927,867 and DE 197 13 333 C2 disclose a snap ring (securing sleeve 6) that may be used as either or both of the snap rings 34 and 40 in the disclosed embodiments.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An automobile wheel bearing comprising:
an inner bearing race comprising a cylindrical bearing surface, the inner bearing race being seated and secured on a periphery of an axle shaft and having a respective inner raceway;
an axle tube concentrically surrounding and spaced radially outward of said axle shaft;
an outer bearing race seated and secured on an interior of said axle tube concentrically surrounding and radially facing said inner bearing race, said outer bearing race being secured at an end to the axle tube by a shoulder formed in said axle tube, said shoulder decreasing a thickness of said axle tube in a region where said outer bearing race is seated and secured on said interior of said axle tube, said outer race having a respective outer raceway, an entirety of said outer raceway being closer to said periphery of said axle shaft than a surface of said axle tube which is closest to said periphery of said axle shaft, the inner and outer races opposing each other;
a plurality of bearing rollers, disposed in a first circumferential row, between and contacting said respective inner and outer raceways in said inner race and said outer race, thereby forming a roller bearing; and
a plurality of bearing balls, disposed in a second circumferential row, between and contacting said respective inner and outer raceways in said inner race and said outer race, thereby forming a ball bearing in parallel with said roller bearing,
wherein:
said roller bearing and said ball bearing simultaneously center said axle shaft within said axle tube while permitting relative rotation of said axle shaft and said axle tube,
said thickness of said axle tube is constant outside of said region where said outer bearing race is seated and secured on said interior of said axle tube,
an outer diameter of said axle tube, in said region where said outer bearing race is seated and secured on said interior of said axle tube, is constant and is equal to a constant outer diameter of a region of said axle tube more distant from a nearest end of said axle shaft than said region where said outer bearing race is seated and secured on said interior of said axle tube, said nearest end of said axle shaft being nearest to said region where said outer bearing race is seated and secured on said interior of said axle tube, and a diameter of the axle shaft underneath the roller bearing is equal to a diameter of the axle shaft underneath the ball bearing.

2. The automobile wheel bearing of claim 1, wherein said inner and outer raceways are both configured for together making two-point contact with said balls.

3. The automobile wheel bearing of claim 1, wherein said inner and outer raceways are both configured for together making three-point contact with said balls.

4. The automobile wheel bearing of claim 1, wherein said inner and outer raceways are both configured for together making four-point contact with said balls.

5. The automobile wheel bearing of claim 1, wherein said inner and outer raceways are both configured for together making angular contact with said balls.

6. The automobile wheel bearing of claim 1, further comprising a respective circumferential bearing cage for each of said rows of said roller bearings and said ball bearings configured to guide said rows as said axle shaft and axle tube rotate relatively.

7. The automobile wheel bearing of claim 1, further comprising inner and outer seals, the inner seal being disposed at an inner end of said inner and outer races, and the outer seal being disposed at an outer end of said inner and outer races, the inner and outer seals being disposed between said inner and outer races, said seals being configured for enclosing said roller and ball bearings between said axle shaft and said axle tube and between said seals for containing lubrication fluid within said bearings.

8. The automobile wheel bearing of claim 7, further comprising an annular cover plate mounted on said axle tube and covering said outer seal.

9. The automobile wheel bearing of claim 8, further comprising a flange extending outwardly from said axle tube to which said cover plate is mounted.

10. An automobile wheel bearing comprising:
an inner bearing race comprising a cylindrical bearing surface, the inner bearing race being seated and secured on a periphery of a first portion of an axle shaft and having a respective first inner raceway;
an axle tube concentrically surrounding and spaced radially outward of said axle shaft;
an outer bearing race seated and secured on an interior of said axle tube concentrically surrounding and radially facing said inner bearing race, said outer bearing race being secured at an end to the axle tube by a shoulder formed in said axle tube, said shoulder decreasing a thickness of said axle tube in a region where said outer bearing race is seated and secured on said interior of said axle tube, said outer race having a respective outer raceway, the inner and outer races opposing each other;
a plurality of bearing rollers, disposed in a first circumferential row, between and contacting said respective outer raceway in said outer race and a respective second inner raceway, provided by a shoulder formed in a periphery of a second portion of said axle shaft, thereby forming a roller bearing; and
a plurality of bearing balls, disposed in a second circumferential row, between and contacting said respective first inner raceway and said respective outer raceway in said inner race and said outer race, thereby forming a ball bearing in parallel with said roller bearing, wherein:
said roller bearing and said ball bearing simultaneously center said axle shaft within said axle tube while permitting relative rotation of said axle shaft and said axle tube,
said thickness of said axle tube is constant outside of said region where said outer bearing race is seated and secured on said interior of said axle tube,
an outer diameter of said axle tube, in said region where said outer bearing race is seated and secured on said interior of said axle tube, is constant and is equal to a constant outer diameter of a region of said axle tube more distant from a nearest end of said axle shaft than said region where said outer bearing race is seated and secured on said interior of said axle tube, said nearest end of said axle shaft being nearest to said region where said outer bearing race is seated and secured on said interior of said axle tube, and
said shoulder formed in said periphery of said second portion of said axle shaft is closer to an end of said axle shaft closest to said shoulder than said first portion of said axle shaft.

11. An automobile wheel bearing comprising:
a respective inner raceway provided by a shoulder formed in a periphery of a first portion of an axle shaft;
an axle tube concentrically surrounding and spaced radially outward of said axle shaft;
an outer bearing race seated and secured on an interior of said axle tube concentrically surrounding and radially facing said inner bearing race, said outer bearing race being secured at an end to the axle tube by a shoulder formed in said axle tube, said shoulder decreasing a thickness of said axle tube in a region where said outer bearing race is seated and secured on said interior of said axle tube, said outer race having a respective outer raceway, an entirety of said outer raceway being closer to said periphery of said first portion of said axle shaft than a surface of said axle tube which is closest to said periphery of said first portion of said axle shaft, the inner and outer races opposing each other;
a plurality of bearing rollers, disposed in a first circumferential row, between and contacting said respective outer raceway in said outer race and said respective inner raceway, thereby forming a roller bearing; and
a plurality of bearing balls, disposed in a second circumferential row, between and contacting said respective outer raceway in said outer race and said respective inner raceway, thereby forming a ball bearing in parallel with said roller bearing, wherein:
said roller bearing and said ball bearing simultaneously center said axle shaft within said axle tube while permitting relative rotation of said axle shaft and said axle tube,
said thickness of said axle tube is constant outside of said region where said outer bearing race is seated and secured on said interior of said axle tube,
an outer diameter of said axle tube, in said region where said outer bearing race is seated and secured on said interior of said axle tube, is constant and is equal to a constant outer diameter of a region of said axle tube more distant from a nearest end of said axle shaft than said region where said outer bearing race is seated and secured on said interior of said axle tube, said nearest end of said axle shaft being nearest to said region where said outer bearing race is seated and secured on said interior of said axle tube, and said shoulder formed in said periphery of said first portion of said axle shaft has a greater diameter than a diameter of a second portion of said axle shaft which is further from an end of said axle shaft than said first portion of said axle shaft.

* * * * *